(12) United States Patent
Brophy et al.

(10) Patent No.: US 10,541,865 B1
(45) Date of Patent: Jan. 21, 2020

(54) WIRELESS CONNECTION VALIDATION TECHNIQUES

(71) Applicant: Alarm.com Incorporated, Tysons, VA (US)

(72) Inventors: Michael Montgomery Brophy, Arlington, VA (US); Charles Richard Alpert, Snoqualmie, WA (US); Roy Franklin Perry, Niwot, CO (US)

(73) Assignee: Alarm.com Incorporated, Tysons, VA (US)

( * ) Notice: Subject to any disclaimer, the term of this patent is extended or adjusted under 35 U.S.C. 154(b) by 113 days.

(21) Appl. No.: 15/810,549

(22) Filed: Nov. 13, 2017

Related U.S. Application Data

(60) Provisional application No. 62/422,185, filed on Nov. 15, 2016.

(51) Int. Cl.
| | |
|---|---|
| *H04L 12/24* | (2006.01) |
| *G06Q 30/08* | (2012.01) |
| *H04L 29/08* | (2006.01) |
| *H04W 88/08* | (2009.01) |

(52) U.S. Cl.
CPC ......... *H04L 41/0813* (2013.01); *G06Q 30/08* (2013.01); *H04L 41/083* (2013.01); *H04L 41/0896* (2013.01); *H04L 67/22* (2013.01); *H04W 88/08* (2013.01)

(58) Field of Classification Search
CPC ... H04L 41/0813; H04L 67/22; H04L 41/083; H04L 41/0896; G06Q 30/08; H04W 88/08
See application file for complete search history.

(56) References Cited

U.S. PATENT DOCUMENTS

| | | | |
|---|---|---|---|
| 6,928,656 B1* | 8/2005 | Addington | .......... H04L 12/2801 370/347 |
| 7,353,396 B2 | 4/2008 | Micali et al. | |
| 8,358,638 B2 | 1/2013 | Scherzer et al. | |
| 2005/0114028 A1 | 5/2005 | Wada | |
| 2008/0211624 A1 | 9/2008 | Micali et al. | |
| 2008/0244707 A1 | 10/2008 | Bowser et al. | |
| 2010/0289643 A1* | 11/2010 | Trundle | ................. G08C 19/16 340/545.1 |
| 2012/0232367 A1 | 9/2012 | Allegri et al. | |
| 2012/0233679 A1 | 9/2012 | Shedrinsky | |
| 2016/0261931 A1* | 9/2016 | Fadell | ...................... H04Q 9/00 |

* cited by examiner

*Primary Examiner* — Jackie Zuniga Abad
(74) *Attorney, Agent, or Firm* — Fish & Richardson P.C.

(57) ABSTRACT

In general, techniques are described for remotely monitoring, controlling, and/or adjusting configuration settings related to network access points located within a rental property. In some implementations, rental data that indicates a property that has been rented for a specified rental period is received. Sensor data collected by one or more sensors of the property during the specified rental period is obtained. A current occupancy of the property during the specified rental period is determined from the sensor data. Network data indicating network activity over a network access point of the property is obtained during the specified rental period. The network access point is configured during the specified rental period based at least on the network activity indicated by the network data and the current occupancy determined for the property from the sensor data.

21 Claims, 9 Drawing Sheets

300

```
┌─────────────────────────────────────────────────────────────────┐
│ OBTAIN DATA INDICATING THAT INTERNET ACCESS THROUGH A NETWORK   │
│ ACCESS POINT WITHIN A PROPERTY IS NOT AVAILABLE             310 │
└─────────────────────────────────────────────────────────────────┘
                                │
                                ▼
┌─────────────────────────────────────────────────────────────────┐
│ IDENTIFY ONE OR MORE CONFIGURATION SETTINGS FOR THE NETWORK     │
│ ACCESS POINT                                                320 │
└─────────────────────────────────────────────────────────────────┘
                                │
                                ▼
┌─────────────────────────────────────────────────────────────────┐
│ TRANSMIT INSTRUCTIONS TO ADJUST THE ONE OR MORE CONFIGURATION   │
│ SETTINGS FOR THE NETWORK ACCESS POINT                       330 │
└─────────────────────────────────────────────────────────────────┘
                                │
                                ▼
┌─────────────────────────────────────────────────────────────────┐
│ IN RESPONSE, DETERMINE WHETHER THE INTERNET ACCESS THROUGH      │
│ THE NETWORK ACCESS POINT WITHIN THE PROPERTY IS AVAILABLE   340 │
└─────────────────────────────────────────────────────────────────┘
```

```
┌─────────────────────────────────────────────────────────────────┐
│ OBTAIN DATA INDICATING THAT INTERNET ACCESS THROUGH A NETWORK   │
│ ACCESS POINT WITHIN A PROPERTY IS NOT AVAILABLE             410 │
└─────────────────────────────────────────────────────────────────┘
                                │
                                ▼
┌─────────────────────────────────────────────────────────────────┐
│ AUTOMATICALLY ESTABLISHING AN ALTERNATE CONNECTION TO THE       │
│ INTERNET                                                    420 │
└─────────────────────────────────────────────────────────────────┘
                                │
                                ▼
┌─────────────────────────────────────────────────────────────────┐
│ PROVIDE INTERNET ACCESS TO DEVICES WITHIN THE PROPERTY          │
│ THROUGH THE ALTERNATE CONNECTION                            430 │
└─────────────────────────────────────────────────────────────────┘
                                │
                                ▼
┌─────────────────────────────────────────────────────────────────┐
│ DETERMINE THAT THE INTERNET ACCESS THROUGH THE NETWORK          │
│ ACCESS POINT WITHIN THE PROPERTY IS AVAILABLE               440 │
└─────────────────────────────────────────────────────────────────┘
                                │
                                ▼
┌─────────────────────────────────────────────────────────────────┐
│ TERMINATE THE ALTERNATE CONNECTION                              │
│                                                             450 │
└─────────────────────────────────────────────────────────────────┘
```

```
┌─────────────────────────────────────────────────────────────┐
│ OBTAIN SENSOR DATA, INTERNET ACTIVITY DATA, AND TENANT DATA │
│           ASSOCIATED WITH A RENTAL PROPERTY                 │
│                                                         610 │
└─────────────────────────────────────────────────────────────┘
                              │
                              ▼
┌─────────────────────────────────────────────────────────────┐
│ DETERMINE ONE OR MORE CURRENT USAGE PARAMETERS FOR A LOCAL  │
│              NETWORK WITHIN THE RENTAL PROPERTY             │
│                                                         620 │
└─────────────────────────────────────────────────────────────┘
                              │
                              ▼
┌─────────────────────────────────────────────────────────────┐
│  GENERATE A DYNAMIC CONFIGURATION FOR THE LOCAL NETWORK     │
│              WITHIN THE RENTAL PROPERTY                     │
│                                                         630 │
└─────────────────────────────────────────────────────────────┘
                              │
                              ▼
┌─────────────────────────────────────────────────────────────┐
│   RECONFIGURE THE LOCAL NETWORK BASED ON THE DYNAMIC        │
│                     CONFIGURATION                           │
│                                                         640 │
└─────────────────────────────────────────────────────────────┘
```

```
┌─────────────────────────────────────────────────────────────┐
│ RECEIVE RENTAL DATA THAT INDICATES A PROPERTY HAS BEEN RENTED│
│              FOR A SPECIFIED RENTAL PERIOD                   │
│                                                        810   │
└─────────────────────────────────────────────────────────────┘
                              │
                              ▼
┌─────────────────────────────────────────────────────────────┐
│ OBTAIN SENSOR DATA COLLECTED BY ONE OR MORE SENSORS OF THE  │
│       PROPERTY DURING THE SPECIFIED RENTAL PERIOD            │
│                                                        820   │
└─────────────────────────────────────────────────────────────┘
                              │
                              ▼
┌─────────────────────────────────────────────────────────────┐
│ DETERMINE A CURRENT OCCUPANCY OF THE PROPERTY DURING THE    │
│              SPECIFIED RENTAL PERIOD                         │
│                                                        830   │
└─────────────────────────────────────────────────────────────┘
                              │
                              ▼
┌─────────────────────────────────────────────────────────────┐
│ OBTAIN NETWORK DATA INDICATING NETWORK ACTIVITY OVER A      │
│ NETWORK ACCESS POINT OF THE PROPERTY DURING THE SPECIFIED   │
│                     RENTAL PERIOD                      840   │
└─────────────────────────────────────────────────────────────┘
                              │
                              ▼
┌─────────────────────────────────────────────────────────────┐
│ CONFIGURE THE NETWORK ACCESS POINT DURING THE SPECIFIED     │
│                     RENTAL PERIOD                            │
│                                                        850   │
└─────────────────────────────────────────────────────────────┘
```

FIG. 8

WIRELESS CONNECTION VALIDATION TECHNIQUES

CROSS-REFERENCE TO RELATED APPLICATION

This application claims the benefit of U.S. Provisional Patent Application No. 62/422,185, filed on Nov. 15, 2016 and titled "WIRELESS CONNECTION VALIDATION TECHNIQUES," which is incorporated herein by reference in its entirety.

TECHNICAL FIELD

This disclosure application relates to rental property monitoring technology and remote internet activity and connectivity monitoring.

BACKGROUND

Properties that are temporarily available for rent often provide complimentary internet access using secured network access points such as routers. A property administrator that manages and/or owns a property may provide guests with access codes that enable the guests access the internet through the secured network access point during a rental period. Configuration settings for the network access point can be periodically adjusted by the property administrator in order maintain network security between multiple guests.

SUMMARY

Techniques are described to enable a property administrator to remotely monitor, control, and/or adjust configuration settings related to network access points located within a rental property. For instance, during a rental period, the property administrator may use a mobile application that enables an associated user device to monitor the current status of a local network within the rental property. As an example, the property administrator may submit instructions on the mobile application to remotely reset the network access point within the rental property in response to receiving a network status indicating that property does not have internet access. In another example, the property administrator may remotely reset or update network access credentials for the local network through the mobile application. In this regard, the techniques described enable a property administrator to conveniently monitor the internet activity of rental guests, diagnose and address internet connectivity issues, and/or improve network security from a remote location.

In some implementations, the system can dynamically configure network connectivity settings for a rental property based on information associated with one or more of rental data, sensor data collected within the rental property, and network activity data collected for devices within the rental property, among other factors. As an example, the system can adjust data usage and/or connection speed associated with a local network based on the type of property rental provided by the property administrator. In another example, real-time sensor data can be collected to identify time periods of low user activity and adjust the network settings accordingly to reduce potential costs associated with network usage that are not attributed to tenants. Other examples of dynamic network adjustments based on various types of data collected by the system are described in more detail below.

In some implementations, the techniques described enable the property administrator to provide guests with a temporary alternative mechanism of accessing the internet when a network access point is malfunctioning or otherwise unable to provide access to the Internet. For instance, the system may include a network-enabled monitor control unit that is capable of accessing the Internet through a cellular network independently from the local network. In such instances, the property administrator may use the mobile application to transmit a remote instruction to re-configure the local network such that outbound and inbound connections from the property are routed through the monitor control unit instead of the network access point for a temporary period of time. The local network can then be re-configured once the network access point is determined to have regained access to the internet.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

FIG. 3 illustrates an example of a process for remotely adjusting network connectivity settings for a rental property.

FIG. 4 illustrates an example of a process for providing internet access through a monitoring system of a rental property.

FIG. 6 illustrates an example of a process for dynamically configuring a local network within a rental property.

FIG. 8 illustrates an example of a process for dynamically configuring a network access point of a property during a specified rental period.

In the figures, like reference numbers represent corresponding parts throughout.

DETAILED DESCRIPTION

In general, techniques are described to enable a property administrator to remotely monitor, control, and/or adjust configuration settings related to network access points located within a rental property. For instance, during a rental period, the property administrator may use a mobile application that enables an associated user device to monitor the current status of a local network within the rental property. As an example, the property administrator may submit instructions on the mobile application to remotely reset the network access point within the rental property in response to receiving a network status indicating that property does not have internet access. In another example, the property administrator may remotely reset or update network access credentials for the local network through the mobile application. In this regard, the techniques described enable a property administrator to conveniently monitor the internet activity of rental guests, diagnose and address internet connectivity issues, and/or improve network security from a remote location.

As described herein, a "property administrator" refers to an individual or an entity that controls access to a rental property. For example, in some instances, a property administrator may be a property owner that retains property title to the property to be rented. In other instances, the property administrator may be an authorized agent of the property owner that manages and rents the property on behalf of the property owner. The property administrator specifies a set of access conditions that are associated with the rental of a property. For example, the property administrator may specify the cost of rental, time periods of availability, or services that are offered along with the property rental.

A "user" (or "prospective tenant" or "tenant") refers to an individual that requests to rent a property that is made available by the property administrator. The user can submit a rental requests through various mediums such as sending a direct email to the property administrator, placing a request through a property rental webpage, and/or through an application that provides property rental services.

Figure 1:
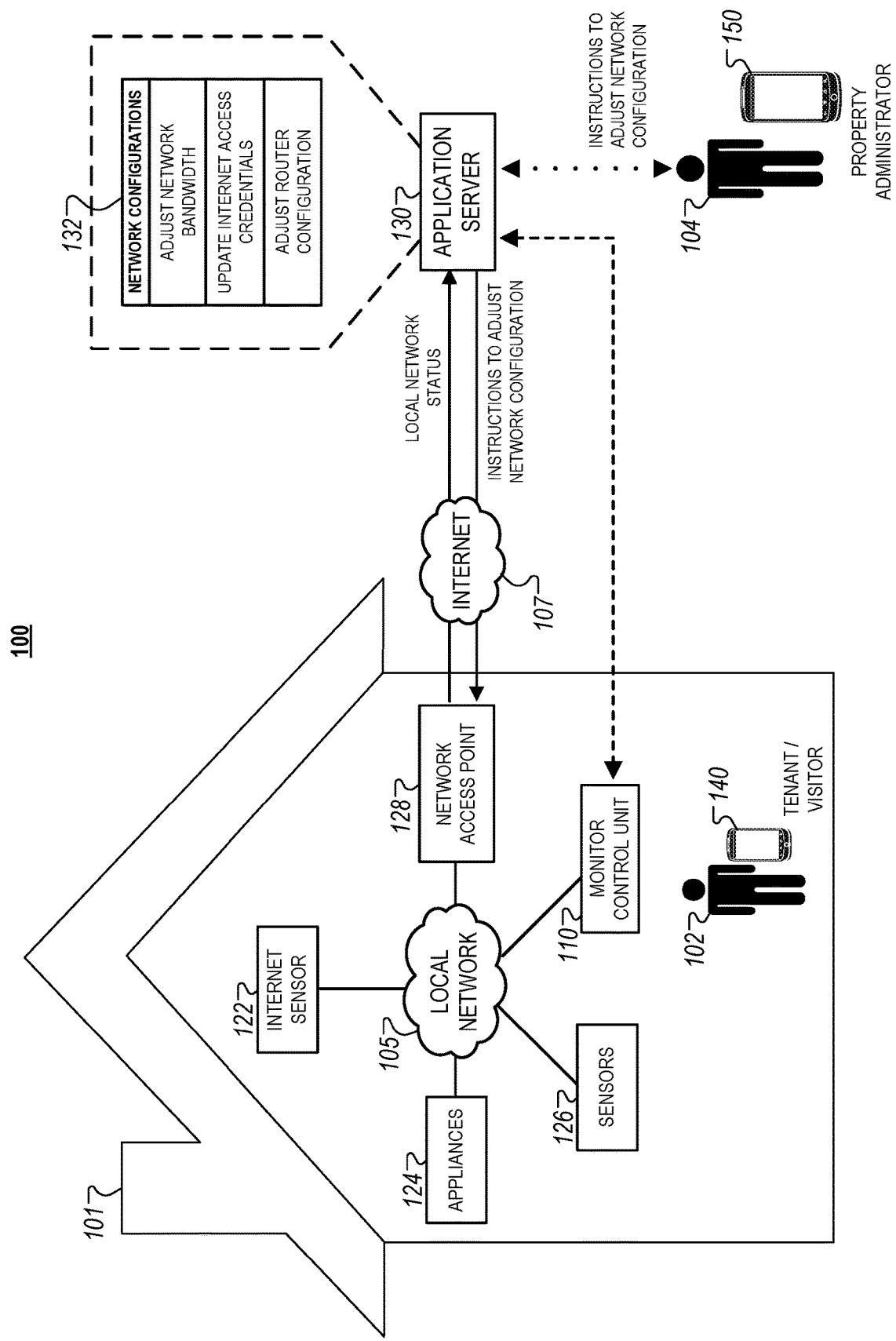
FIG. 1 illustrates an example of system that is capable remotely adjusting network connectivity settings for a rental property.

FIG. 1 illustrates a diagram of an example of a property management system 100 that is associated with a property 101. Although this disclosure is written in the context of monitoring network connectivity within a rental property, systems and techniques described herein can also be used for controlling access to properties for purchase (e.g., condos, houses, and/or commercial headquarters). Although FIG. 1 illustrates one property for brevity, the application server 130 may also manage network access points for multiple properties and/or structures. For example, the application server 130 may communicate directly with the monitor control unit 110 or through other communications media and protocol (e.g., through the network 105, over Bluetooth, Zigbee, etc.).

The system 100 may include a monitor control unit 110, an internet sensor 122, appliances 124, sensors 126, a network access point 128, and an application server 130 connected over a local network 105. The local network 105 enables the monitor control unit 110, internet sensor 122, appliances 124, sensors 126, and network access point 128 to access the Internet 107. In addition, the local network 105 enables the monitor control unit 110 to exchange data communications with the application server 130 through the network access point 128. The data communications between the monitor control unit 110 and the application server 130 can include to data related to rental reservations and/or information related to the rental reservations. The local network 105 also enables the system 100 to maintain data that provides credentials necessary to gain access to the during a rental period of the rental property 101.

As described above, the architecture of the system 100 enables a property administrator 104 to remotely monitor, control, and/or adjust configuration settings related to network access points located within a rental property. For instance, the property administrator 104 may use a mobile application that enables an associated user device 150 to transmit network configuration instructions to the application server 130, which then transmits corresponding network configuration instructions to the monitor control unit 110 either via the network access point 128 of the local network 105, or directly via a cellular network connection independent of the local network 105. As described more particularly with respect to FIGS. 2A and 2B below, the mobile application enables the property administrator 104 to perform various network monitoring functions such as viewing a current network status of the local network 105, placing network restrictions on the local network 105, and viewing connected devices on the local network 105, among other functions. The application also enables the property administrator 104 to receive alert notifications indicating to the network connectivity and/or activity of the local network 105.

Once a rental agreement and/or confirmation has been formed between the prospective tenant 102 and the property administrator 104, the rental property 101 is then rented to the prospective tenant 102. During the rental period, the tenant 102 may be provided with network credentials such as a username and/or password to access to connect to the local network 105 through the network access point 128 and obtain access to the internet 107. Once the tenant 102 has obtained access to the internet 107, the property administrator 104 can use the application to monitor internet activity by a user device 140 associated with the tenant 102. In addition, the property administrator 104 may also use the application to perform various remote diagnostic operations for connectivity issues experienced by the tenant 102.

The local network 105 may be configured to enable electronic communications between devices connected to the local network 105. For example, the local network 105 may be configured to enable exchange of electronic communications between the internet 107, monitor control unit 110, the internet sensor 122, the appliances 124, the sensors 126, the network access point 128, and the mobile device 140. The local network 105 may include, for example, Local Area Networks (LANs), for example, Wi-Fi, analog or digital wired and wireless telephone networks, for example, a public switched telephone network (PSTN), Integrated Services Digital Network (ISDN), a cellular network, and Digital Subscriber Line (DSL), Ethernet, Internet Protocol (IP) over broadband, radio, television, cable, satellite, or any other delivery or tunneling mechanism for carrying data. The local network 105 may include multiple networks or subnetworks, each of which may include, for example, a wired or wireless data pathway. The local network 105 may also include a circuit-switched network, a packet-switched data network, or any other network able to carry electronic communications (e.g., data or voice communications). For example, the local network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The local network 105 may include one or more networks that include wireless data channels and wireless voice channels. The local network 105 may also be a wireless network, a broadband network, or a combination of networks including a wireless network and a broadband network.

The monitor control unit 110 may be an electronic device that coordinates and/or monitors the operations of the components of the system 100 through a set of data transmissions with each of the components of the system 100. The monitor control unit 110 includes a controller and a network module. The controller is configured to control a system 100 (e.g., a home alarm or security system) that includes the monitor control unit 110. In some examples, the controller may include a processor or other control circuitry configured to execute instructions of a program that controls operation of an alarm system. In these examples, the controller may be configured to receive input from sensors, detectors, or other devices included in the alarm system and control operations of devices included in the alarm system or other household devices (e.g., a thermostat, an appliance, lights, etc.). For example, the controller may be configured to control operation of the network module included in the monitor control unit 110.

The network module is a communication device configured to exchange communications over the network 105. The network module may be a wireless communication module configured to exchange wireless communications over the network 105. For example, the network module may be a wireless communication device configured to exchange communications over a wireless data channel and a wireless voice channel. In this example, the network module may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module may also be a wired communication module configured to exchange communications over the network 105 using a wired connection. For instance, the network module may be a modem, a network interface card, or another type of network interface device. The network module may be an Ethernet network card configured to enable the monitor control unit 110 to communicate over a local area network and/or the Internet. The network module also may be a voice-band modem configured to enable the alarm panel to communicate over the telephone lines of Plain Old Telephone Systems (POTS).

The monitor control unit 110 also may include a communication module that enables the monitor control unit 110 to communicate other devices of the system 100. The communication module may be a wireless communication module that allows the monitor control unit 110 to communicate wirelessly. For instance, the communication module may be a Wi-Fi module that enables the monitor control unit 110 to communicate over a local wireless network at the rental property 101. The communication module further may be a 900 MHz wireless communication module that enables the monitor control unit 110 to communicate directly with a monitor control unit. Other types of short-range wireless communication protocols, such as Bluetooth, Bluetooth LE, Zwave, ZigBee, etc., may be used to allow the monitor control unit 110 to communicate with other devices in the rental property 101.

In some examples, the monitor control unit 110 may include data capture and recording devices. In these examples, the monitor control unit 110 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the rental property 101 and users in the property.

The monitor control unit 110 further may include processor and storage capabilities. The monitor control unit 110 may include any suitable processing devices that enable the monitor control unit 110 to operate applications and perform the actions described throughout this disclosure. In addition, the monitor control unit 110 may include solid state electronic storage that enables the monitor control unit 110 to store applications, configuration data, collected sensor data, and/or any other type of information available to the monitor control unit 110.

The monitor control unit 110 may exchange communications with the internet sensor 122, the appliances 124, the sensors 126, and the application server 130 using multiple communication links. The multiple communication links may be a wired or wireless data pathways configured to transmit signals from the internet sensor 122, the appliances 124, the sensors 126, and the application server 130 to the controller. The internet sensor 122, the appliances 124, the sensors 126, and the application server 130 may continuously transmit sensed values to the controller, periodically transmit sensed values to the monitor control unit 110, or transmit sensed values to the monitor control unit 110 in response to a change in a sensed value.

In some implementations, the monitor control unit 110 may additionally be used to perform routine surveillance operations on a property. For instance, the monitor control unit 110 may be assigned to one or more particular properties within a geographic location and may routinely collect surveillance footage during specified time periods (e.g., after dark), which may then be transmitted to the application server 130 for transmitting back to each particular property owner. In such implementations, the property owner may receive the surveillance footage over the local network 105 as a part of a service provided by a security provider that operates the application server 130. For example, transmissions of the surveillance footage collected by the monitor control unit 110 may be part of a premium security service package provided by a security provider in addition to the routine drone emergency response service.

In some implementations, the monitor control unit 110 may monitor the operation of the electronic devices of the system 100 such as the appliances 124, the sensors 126, the internet access point 128, and the application server 130. For instance, the monitor control unit 110 may enable or disable the devices of the system 100 based on a set of rules associated with energy consumption, user-specified settings, and/or other information associated with the conditions near or within the rental property 101 where the system 100 is located. In some examples, the monitor control unit 110 may be used as a replacement to a traditional security panel (or monitor control unit) that is used to monitor and control the operations of the system 100. In other examples, the monitor control unit 110 may coordinate monitoring operations with a separate security panel of the system 100. In such examples, the monitor control unit 110 may monitor particular activities of the devices of the system 100 that are not monitored by the security panel, or monitor the operation of particular devices that are not monitoring by the security panel.

As described above, the rental property 101 may include various monitoring devices that are each capable of performing individual monitoring operations and/or capable of performing a set of coordinated operations based on instructions received from either the monitor control unit 110 or the application server 130. For instance, the rental property 101 may include the internet sensor 122, the appliances 124, the sensors 126, the network access point 128, the application server 130, and other devices that provide monitoring data associated with devices, areas, or individuals located nearby or within the premises of the rental property 101. As an example, the sensors 126 located on the rental property 101 may provide video, still images, or other monitoring data, and may provide data via a live feed, transmit data to be stored in a remote location, store data locally for review at a later time, etc. As another example, sensors 126 located on the rental property 101 may include motion sensors, heat sensors, pressure sensors, resistive sensors, etc. that periodically collected sensed data indicating conditions of the rental property 101. The sensors 126 may communicate with the system 100 and transmit monitoring data for processing to the monitoring control unit 110. In some examples, the sensors 126 may store collected data locally or transmit monitoring data to be stored in a remote location (e.g., the application server 130).

The internet sensor 122 may be an electronic device configured to monitor internet activity over the local network 105 by exchanging electronic communications with the monitor control unit 110, the appliances 124, the sensors 126, the network access point 128, and any client devices connected over the local network 105. For example, the internet sensor 122 may monitor the internet activity of the monitor control unit 110, the appliances 124, the sensors 126, and/or any other network-enabled client devices connected over the local network 105. The internet sensor 122 can also submit requests to various Internet sites to confirm the connectivity of the local network 105 to the internet 107.

The internet sensor 122 may transmit reports of the internet activity of devices connected over the local network 105 to either the monitor control unit 110 or the application server 130. For example, the internet sensor 122 may regularly transmit internet activity reports to the monitor control unit 110 and/or the application server 130, which in response, may determine if there is any detected abnormal internet activity. The monitor control unit 110 or the application server 130 may then transmit alert notifications indicating the detected abnormalities to the user device 150 of the property administrator 104. For instance, the activity reports may include inbound and outbound traffic activity over the local network 105, identification, browsing history, and downloads of the devices such as the appliances 124, the sensors 126, or the user device 140 over the local network 105, or other information that may be relevant to internet traffic over the local network 105.

In some implementations, in response to receiving activity reports indicating unusual internet traffic over the local network 105 (e.g., websites accessed, time of activity, excessive bandwidth), the monitor control unit 110 or the application server 130 may analyze the activity reports and compare the data generated by the sensors 126 to determine if there may be a potential Internet security breach. For example, if the activity report generated by the internet sensor 122 indicates excessive data usage during particular time periods, the monitor control unit 110 or the application server 130 may cross-reference the time periods identified as having excessive data usage to occupancy data indicating whether users were present within the property during the identified time periods. In such examples, the monitor control unit 110 or the application server 130 may determine, based on the sensor data indicating that users were not present within the property, that there may be a breach in the internet security, for example, malware processes executing on the devices and/or mobile devices on the property 101 that are using bandwidth. In another example, the monitor control unit 110 or the application server 130 may determine the activity report from the internet sensor 122 indicates that little Internet activity is occurring when the property is not occupied so that there is no potential Internet security breach.

In other implementations, the activity reports may be used to determine occupancy of the property. For example, if the activity report indicates normal internet traffic activity for when the tenant 102 is actively using the appliances 124 or the user device 140, the monitor control unit 110 or the application server 130 may use that activity report in determining that the property is occupied. In another example, in response to a triggered alarm event within a property, the monitor control unit 110 or the application server 130 may analyze the recent activity report transmitted by the internet sensor 122 to determine user activity within the property. For instance, if the activity report indicates normal internet traffic activity, the monitor control unit 110 or the application server 130 may determine that there is no security breach within the property and that the triggered alarm event may have been a false alarm.

The appliances 124 may be home automation devices connected to the network 105 that are configured to exchange electronic communications with other devices of the system 100. The appliances 124 may include, for example, connected kitchen appliances, controllable light sources, safety and security devices, energy management devices, and/or other types of electronic devices capable of exchanging electronic communications over the network 105. In some instances, the appliances 124 may periodically transmit information and/or generated data to the monitor control unit 110 such that the monitor control unit 110 can automatically control the operation of the appliances 124 based on the exchanged communications. For example, the monitor control unit 110 may operate one or more of the appliances 124 based on a fixed schedule specified by the user. In another example, the monitor control unit 110 may enable or disable one or more of the appliances 124 based on received sensor data from the sensors 126.

The system 100 may include the sensors 126. The sensors 126 can include one or more of a contact sensor, a motion sensor, a glass break sensor, an occupancy sensor, or any other type of sensor that can be included in an alarm or security system. The sensors 126 may also include an environmental sensor, such as a temperature sensor, a water sensor, a rain sensor, a wind sensor, a light sensor, a smoke detector, a carbon monoxide detector, an air quality sensor, etc. The sensors 126 may further include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 126 may include a radio-frequency identification (RFID) sensor that identifies a particular article that includes a pre-assigned RFID tag.

In some implementations, the system 100 may include one or more cameras. The cameras may be video/photographic cameras or other type of optical sensing devices configured to capture images. For instance, the cameras may be configured to capture images of an area within a building monitored by the monitor control unit 110. The cameras may be configured to capture single, static images of the area and also video images of the area in which multiple images of the area are captured at a relatively high frequency (e.g., thirty images per second). The cameras may be controlled based on commands received from the monitor control unit 110.

The cameras may be triggered by several different types of techniques. For instance, a Passive Infrared (PIR) motion sensor may be built into the cameras and used to trigger the cameras to capture one or more images when motion is detected. The cameras also may include a microwave motion sensor built into the camera and used to trigger the cameras to capture one or more images when motion is detected. The cameras may have a "normally open" or "normally closed"

digital input that can trigger capture of one or more images when external sensors (e.g., the sensors 126, PIR, door/window, etc.) detect motion or other events. In some implementations, the cameras receive a command to capture an image when external devices detect motion or another potential alarm event. The cameras may receive the command from the controller or directly from one of the sensors 126.

In some examples, the cameras trigger integrated or external illuminators (e.g., Infra Red, Z-wave controlled "white" lights, etc.) to improve image quality when the scene is dark. An integrated or separate light sensor may be used to determine if illumination is desired and may result in increased image quality.

The cameras may be programmed with any combination of time/day schedules, system "arming state", or other variables to determine whether images should be captured or not when triggers occur. The cameras may enter a low-power mode when not capturing images. In this case, the cameras may wake periodically to check for inbound messages from the controller. The cameras may be powered by internal, replaceable batteries if located remotely from the monitor control unit 110. The cameras may employ a small solar cell to recharge the battery when light is available. Alternatively, the cameras may be powered by the controller's power supply if the cameras are co-located with the controller.

In some implementations, the cameras communicate directly with the application server 130 over the Internet. In these implementations, image data captured by the cameras does not pass through the monitor control unit 110 and the cameras receives commands related to operation from the application server 130.

The system 100 may also include the network access point 128. The network access point 128 may be, for example, a network router connected to a moment that receives an internet connection from an internet service provider (ISP). For instance, the router may be a residential gateway that provides a subnetwork for the monitor control unit 110, the internet sensor 122, the appliances 124, the sensors, and the user device 140 connected to the local network 105.

The network access point 128 may enable the user device 150 and other devices connected over the local network 105 to establish public connections to one or more public servers. For example, the network access point 128 may provide internet access for the monitor control unit 110, the internet sensor 122, the appliances 124, the sensors 126, and the user device 150. As described throughout, public servers may be servers connected to the internet 107 that are associated with public internet protocol addresses.

In some implementations, the local network 105 may include network access points that each provide different subnetworks within the local network 105. In such implementations, the system 100 may include separate internet sensors 122 for each subnetwork within the local network 105. For example, if the system 100 includes a local network 105 with two subnetworks hosted by two routers, the system 100 may include two internet sensors 122 to monitor the traffic of each respective subnetwork.

The application server 130 is an electronic device configured to provide monitoring services by exchanging electronic communications with the monitor control unit 110 and the user device 140 over the local network 105 and the internet 107. For example, the application server 130 may be configured to monitor events (e.g., start or end of a rental period, user activity data collected during a rental period) generated by the monitor control unit 110 and/or other devices connected over the local network 105. In this example, the application server 130 may exchange electronic communications with the network module included in the monitor control unit 110 to receive information regarding events detected by the monitor control unit 110. The application server 130 also may receive information regarding events from the user device 150 of a property administrator 104 (e.g., rental property information, internet connectivity information, and/or configuration data for the network access point 128).

The application server 130 may also exchange data communications with the user device 150 associated with the property administrator 104. For instance, the application server 130 may be associated with an application that runs on the user device 150. The application may provide various types of information related to the local network 105 within the rental property 101. For example, the application may provide the property administrator 104 with a current network status of the local network 105, text messages sent from the user device 140, and/or configuration information for the local network 105. In addition, the property administrator 104 may use the application to remotely monitor, configure, and/or adjust the local network 105. More particular descriptions related to the application are provide below with respect to FIGS. 2A and 2B.

The network configurations 132 refer to adjustments and/or specifications for the local network 105 that are remotely transmitted to either the network access point 128 and/or the monitor control unit 110. In some instances, the network configurations 132 include instructions that are provided by the property administrator 104 through an application running on the user device 150. For example, the property administrator 104 can provide an instruction to power cycle the network access point 128 on the user device 150, which is then transmitted through the application server 130 to the network access point 128. In other instances, the network configurations 132 include automated adjustments to the local network 105 based on the sensor data collected by the sensors 126, internet activity reports generated by the internet sensor 122, among other types of pertinent information related to the rental property 101. For example, as described more particularly with respect to FIGS. 6 and 7, the application server 130 may utilize a set of network configuration rules to automatically adjust the configuration of the local network 105 based on sensor data and internet activity data.

In the examples depicted, the network configurations 132 include options to adjust network bandwidth, update internet access credentials, and adjust configuration of the network access point 128. In this regard, data communications between the monitor control unit 110, the network access point 128, the application server 130, and the user device 150 allow for manual or automatic adjustments to the local network 105 during a rental period of the rental property 101. In some instances, the network configurations 132 can alternatively include an option to adjust data usage on the network access point 128.

In some implementations, the application server 130 stores sensor and image data received from the monitor control unit 110 and performs analysis of the received sensor and image data. Based on the analysis, the application server 130 may communicate with and control aspects of the monitor control unit 110 or the user device 140.

The user device 140 may be an electronic device associated with a prospective tenant or the tenant 102 and the user device 150 may be an electronic device associated with the property administrator 104. The user devices 140, 150 that exchange network communications over the network 105. For example, the user devices 140, 150 may be one or more of a smartphone, tablet, personal computer (PC), network-enabled media player, home entertainment system, cloud storage device, and other types of network devices.

Figure 2A:
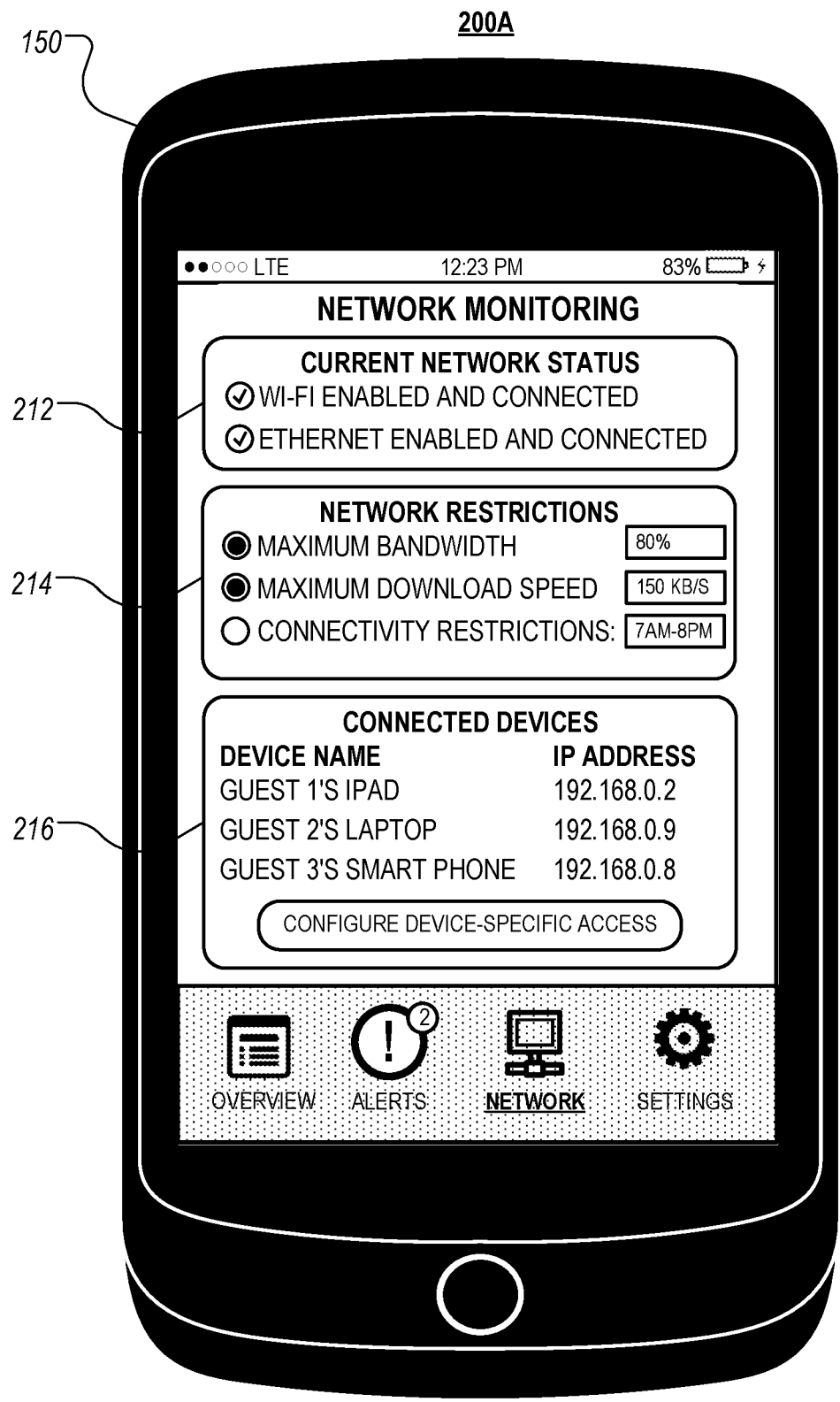
FIGS. 2A-2B illustrate examples of user interfaces that enable a property administrator to remotely monitor connectivity of a local network within a rental property.
Figure 2B:
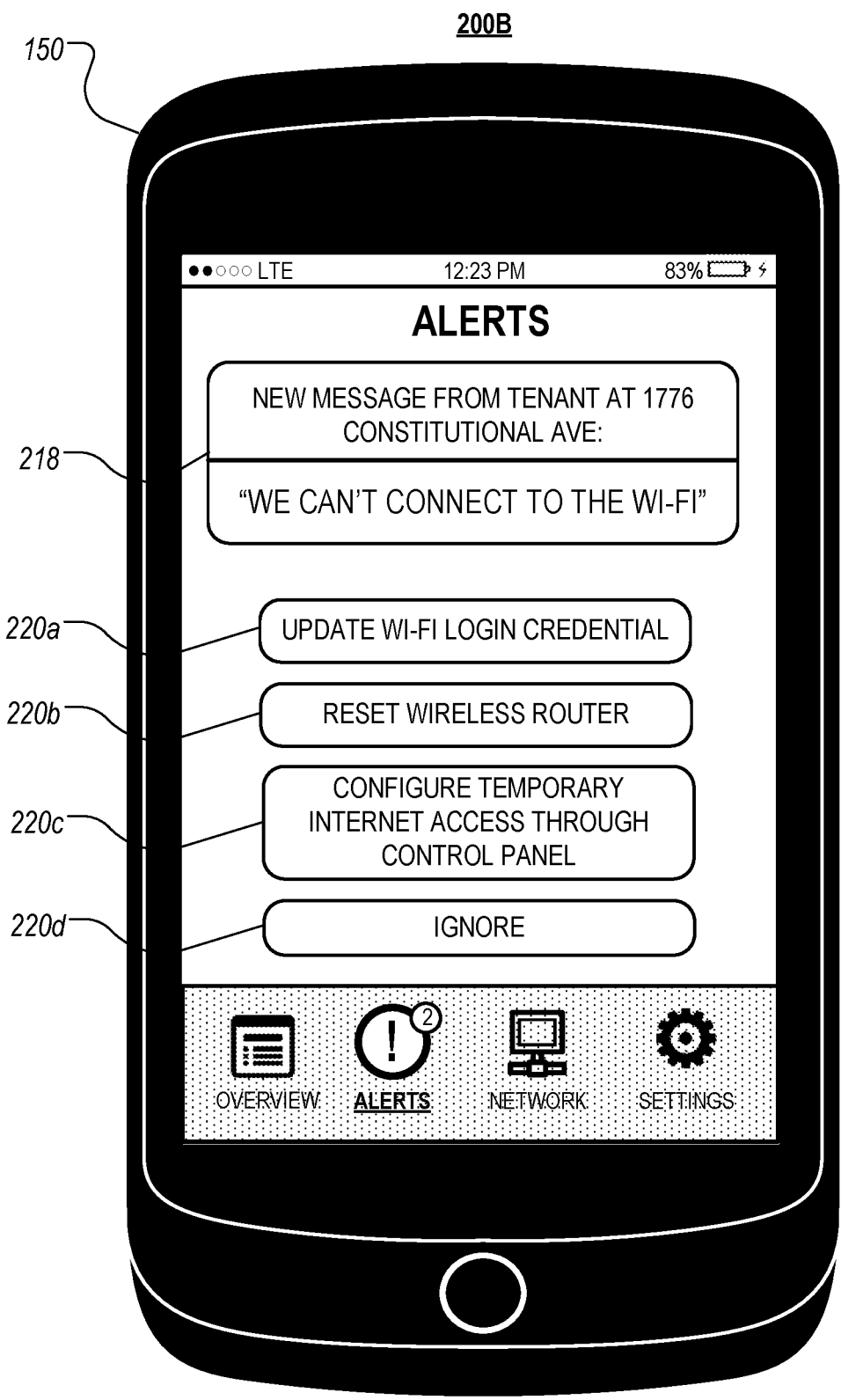

The user device 150 may access an application made available by the application server 130 on local the network 105 and/or the internet 107, such as a mobile application (depicted in FIGS. 2A-2B). As described in more detail below, the application can be used by the property administrator 104 to remotely view information related to the local network 105 such as a current connectivity status, devices presently connected to the local network 105, or internet activity associated with the devices. The application may also enable the property administrator 104 to place certain restrictions on the local network 105 (e.g., data usage restrictions, maximum download speeds, or specified time periods of internet connectivity). In some implementations, the application may also enable the property administrator 104 to transmit remote instructions to perform diagnostic operations to adjust the configuration of the local network 105.

The user devices 140, 150 can include one or more native applications. The native applications refer to software/firmware programs running on the corresponding mobile device that enables the user interface and features described throughout. The user devices 140, 150 may load or install the native surveillance application based on data received over a network (e.g., the local network 105) or data received from local media. The native application is capable of operating on various mobile devices platforms. The native application also enables the user devices 140, 150 to receive and process rental property data from the system 100.

In some implementations, the user devices 140, 150 communicate with and receive system data from the monitor control unit 110 or the application server 130 using a communication link. For instance, the user devices 140, 150 may communicate with the monitor control unit 110 using various local wireless protocols such as Wi-Fi, Bluetooth, Zwave, Zigbee, HomePlug (Ethernet over powerline), or wired protocols such as Ethernet and USB, to connect the user devices 140, 150 to local security and automation equipment. The user devices 140, 150 may connect locally to the system 100 and sensors 126 and other devices. The local connection may improve the speed of status and control communications because communicating through the local network 105 and the internet 107 with a remote server (e.g., the application server 130) may be significantly slower.

Although the user devices 140, 150 are shown as communicating with the application server 130, the user devices 140, 150 may also communicate directly with the sensors 126 and other devices controlled by the monitor control unit 110 when the user devices 140, 150 are near the rental property 101. For example, the user devices 140, 150 may exchange communications with the devices of the system 100 over the network 105.

In some implementations, the user devices 140, 150 receive system data captured by the monitor control unit 110 through the network 105. The user devices 140, 150 may receive the data from the monitor control unit 110 through the network 105 or the application server 130 may relay data received from the monitor control unit 110 to the user devices 140, 150 through the network 105. In this regard, the application server 130 may facilitate communication between the user devices 140, 150 and the system 100.

In some implementations, the system 100 intelligently leverages the monitor control unit 110 to aid in security monitoring, property automation, and property management. For example, the monitor control unit 110 may aid in investigating alarm events detected at the rental property 101 by the monitor control unit 110. In this example, the monitor control unit 110 may detect an alarm event (e.g., a fire alarm, an entry into the rental property 101 when the system is armed "Stay," etc.) and, based on the detected alarm event, control the monitor control unit 110 to attempt to identify persons in the rental property 101 at the time of the alarm event. Specifically, the monitor control unit 110 may send a control command that causes the sensors 126 and the cameras to perform a coordinated and automated search for persons in the rental property 101. Based on the control command received, each of the cameras captures images of the rental property 101.

The network monitoring techniques described throughout may be performed either entirely by the internet sensor 122 or the monitor control unit 110, or by a combination of the two components. For example, the internet sensor 122 may monitor network connectivity, whereas the monitor control unit 110 may monitor internet activity by the various devices connected on the local network 105. In such implementations, the monitor control unit 110 and the internet sensor 122 may periodically exchange data transmissions in order to provide updates relating to the monitoring techniques performed by each individual component. For example, in response to the internet sensor 122 detecting a connectivity outage, a corresponding signal may be transmitted to the monitor control unit 110 to adjust the internet activity monitoring of devices that were previously connected to the network 105.

In some implementations, the monitoring techniques discussed throughout can be performed during time periods when the property 101 has not been rented to a tenant (i.e., during a time period between specified rental periods). For example, the application server 130 and/or the monitor control unit 110 can obtain sensor data collected by the sensors 126 and network data collected by the internet sensor 122 before a rental period is scheduled to be started and/or after a rental period is scheduled to be ended. The application server 130 and/or the monitor control unit 110 can also determine a current occupancy during these time periods. In such implementations, the obtained sensor data, network data, and the current occupancy can be used to identify unauthorized access or activity within the property 101 during time periods when the property 101 is not being actively rented by a tenant. For example, the application server 130 and/or the monitor control unit 110 can identify unauthorized network activity over the network access point 128 if the network data indicates detected network activity during a time period when the property 101 is expected to be vacant. As another example, the application server 130 and/or the monitor control unit 110 can determine an unauthorized intrusion within the property 110 if the obtained sensor data indicates that the property 101 is presently occupied by one or more individuals during a time period when the property 101 is expected to be vacant.

FIGS. 2A-2B illustrate examples of user interfaces that enable a property administrator to remotely monitor the local network 105 within a rental property 101. FIG. 2A illustrates an example of a user interface 200A that enables the property administrator 104 to monitor network activity over the local network 105. FIG. 2B illustrates an example of a user interface 200B that enables the property administrator 104 to remotely diagnose and address network connectivity issues related to the local network 105. In some instances, the interfaces 200A and 200B are provided for output on the user device 150 through an application associated with the application server 130.

Referring initially to FIG. 2A, the interface 200A includes an interface element 212 for checking a current status associated with the local network 105. In the example depicted, the interface element 212 illustrates that both wireless and wired connections over the local network 105 are enabled and connected. A wireless connection can refer to Wi-Fi connections provided through the network access point 128, whereas wired connection refer to Ethernet connections connected directly to the network access point 128. In some instances, if the local network 105 is having connectivity-related issues, the property administrator 104 may view real-time status updates within the interface element 212 reflecting a connectivity status of a corresponding network.

The interface 200A also includes interface element 214 that enable the property administrator 104 to specify manual restrictions that adjust the configuration of the local network 105. In the examples depicted, the property administrator may specify a maximum network bandwidth for the local network 105 (e.g., 80% of all available bandwidth), a maximum download speed for all devices connected over the local network 105 (e.g., 150 kilobytes per second), and/or time period for which the devices can access the Internet 107 through the local network 105 (e.g., internet access only between 7 AM and 8 PM). In each of these examples, settings within the interface element 214 can be configured manually by the property administrator 104 throughout a rental period of the rental property 101, or automatically using a set of dynamic network configuration rules described in more detail below with respect to FIG. 7. In some examples, the property administrator 104 can manually place restrictions on the local network 105 based on excessive network usage by tenant 102 over the rental period. These manual restrictions can be placed by specifying user inputs on the interface element 214, which then transmitted to the monitor control unit 110 through the application server 130. In other examples, the application server 130 may automatically place restrictions on the local network in response to satisfaction of conditions or triggers associated with a particular dynamic network configuration rule.

The interface 200A also includes an interface element 216 for identifying devices connected to the local network 105. The interface element 216 displays a list of devices within the rental property 101 that are presently connected to the local network 105. In the examples depicted, the interface element 216 identifies three devices associated with three guests or tenants, and corresponding IP addresses assigned to the devices by the network access point 128. The interface element 216 also enables the property administrator 104 to place device-specific restrictions over the local network 105. For instance, in comparison to the network restrictions placed through the interface element 214, the device-specific restrictions can be applied to each a particular IP address assigned to a particular device. As an example, a device-specific bandwidth restriction can be placed on a particular device that is indicated as using a majority of the internet bandwidth over the local network 105.

Referring now to FIG. 2B, the interface 200B provides alert notifications such as alert notification 218 relating to the configuration and operation of the local network 105 within the rental property 101. For instance, the interface 200B may provide alert notifications related to temporary connectivity outages, inconsistent network performance, and/or problematic internet activity or usage patterns related to the local network 105. In the example depicted, the alert notification 218 includes a text message sent from the tenant 102 indicating that he/she is unable to access a Wi-Fi network associated with the local network 105. In this example, the interface 200B can be configured to monitor incoming messages from the tenant 102 and provide the messages as alert notifications through the application that displays the interface 200B on the user device 150.

In addition to providing alert notifications for the property administrator 104, the interface 200B also provides interface elements 220a-220d for display to diagnose and/or resolve network issues related to the local network 105. For example, the interface element 220a allows the property administrator 104 to update network access credentials to access the internet 107 through the network access point 128. In this example, the network access credentials provided to the tenant 102 prior to or during the rental period may be incorrect or invalid, which then causes the network connectivity issues. The property administrator 104 can then configure new network access credential remotely through the interface 200B without having to visit the rental property 101 and/or directly access the settings for the network access point 128. In another example, the interface element 220b enables the property administrator 104 to either power reset or software reset the network access point 128. In this example, the network access point 128 may be improperly functioning, which causes the connectivity issues faced by the tenant 102. The property administrator 104 can then use the interface element 220b to transmit a remote reset signal to power cycle the network access point 128.

The interface 200B also provides the property administrator 104 with the ability to configure temporary internet access to the internet 107 through the monitor control unit 110 using the interface element 220c. In this example, if the prior internet connectivity diagnostic techniques using the interface elements 220a and 220b prove ineffective, then the property administrator 104 may transmit a remote signal through the application server 130 to reconfigure the local network 105 through a dedicated cellular connection available on the monitor control unit 110, rather than the network access point 128, to provide the tenant 102 with access to the internet 107. As described more particularly with respect to FIGS. 4-5, this technique includes establishing an alternate connection through the monitor control unit 110 such that the devices within the rental property 101 can access the internet 107 during a temporary time period when the network access point 128 is not functioning properly. In some implementations, the property administrator 104 may also use the interface 200A described above to place network restrictions over the alternate connection through the monitor control unit 110. For example, because the alternate connection is costlier to use compared to the local network 105, the property administrator 104 may choose to set data usage and connectivity restrictions to prevent excessive usage during the temporary time period.

FIG. 3 illustrates an example of a process 300 for remotely adjusting network connectivity settings for a rental property. Briefly, the process 300 may include obtaining data indicating that internet access through a network access pint within a property is not available (310), identifying one or more configuration settings for the network access point (320), transmitting instructions to adjust the one or more configuration settings for the network access point (330), and determining whether internet access through the network access point within the property is available (340).

In more detail, the process 300 may include obtaining data indicating that internet access through a network access point within a property is not available (310). For instance, the user device 150 associated with the property administrator 104 may obtain data from the application server 130 indicating that internet access through the network access point 128 is presently not available. As described above, this can be due to the network access credentials being incorrect or invalid, preventing the tenant 102 from gaining access to the local network 105, or due to malfunctioning of the network access point 128 (e.g., unavailability of the Domain Name System (DNS) server). The internet access through the local network 105 may be periodically monitored either by the internet sensor 122 or the monitor control unit 110. For example, the internet sensor 122 or the monitor control unit 110 may transmit requests to various Internet sites to confirm the connectivity of the local network 105 to the internet 107. Once an interruption to the internet connectivity is detected, a notification indicating the interruption can be transmitted to the application server 130 and then relayed to the user device 150 through the application associated with the application server 130. As described above, this can be represented as the alert notification 218 provided on the interface 200B.

The process 300 may include identifying one or more configuration settings for the network access point (320). For instance, in response to detecting an interruption to the connectivity over the local network 105, the user device 150 may automatically identify configuration settings for the network access point 128 that are potentially causing the interruption. As an example, if the tenant 102 is unable to authenticate into the local network 105 using a specified network access credential (e.g., WEP, WPA, or WPA2 key), then the user device 150 may automatically identify a possible issue relating to an expired and/or invalid access credential. In another example, if the tenant 102 uses the correct and valid access credential, but is still unable to connect to the local network 105, then the user device 150 may obtain network log data from a device attempting to connect to the local network 105 in order to identify a configuration setting causing the interruption in connectivity. For instance, internet log data indicating that an IP address assigned to a particular device is invalid may be used to identify an incorrect configuration setting for the network access point 128. In other instances, the user device 150 may automatically obtain network connectivity log data from the network access point 128 directly in order to identify a potentially problematic configuration setting.

The process 300 may include transmitting instructions to adjust the one or more configuration settings for the network access point (330). For instance, the user device 150 may transmit instructions to adjust the configuration settings identified in step 340 after performing diagnostic tests on the local network 105 and determining that the adjusted configuration settings resolve the interruption in the connectivity of the local network 105.

In some implementations, this process is performed automatically by either the application server 130 and/or an associated application running on the user device 150. This is accomplished by a set of diagnostic operations that run predetermined network connectivity tests associated with a set of network configuration settings that are determined to have previously impacted the connectivity over the local network 105 within the rental property. In such implementations, the application server 130 and/or the user device 150 can be used to automatically diagnose and address internet connectivity issues without any user input from the property administrator 104.

Additionally, or alternatively, in some implementations, the configuration settings can be manually adjusted by the property administrator 104 using an application that runs on the user device 150 that is associated with the application server 130. For instance, as described previously with respect to FIGS. 2A and 2B, the property administrator 104 may view network connectivity information for the local network 105 on the application, and then provide user inputs on the application to remotely adjust network configurations for the local network 105. For example, the property administrator 104 may use interface 200B to view or change network access credentials for authenticating into the local network 105, remotely power cycle or software reset the network access point 128, configure temporary internet access through the monitor control unit 110, among other types of adjustments.

The process 300 may include determining whether internet access through the network access point within the property is available (340). For instance, after the user device 150 has transmitted instructions to adjust the configuration settings for the network access point 128, the monitor control unit 110 may monitor the network access point 128 to determine if the interruption in connectivity has ended. In response determining that the interruption has ended, the monitor control unit 110 may transmit a signal to the application server 130, when then relays a corresponding signal to the user device 150 to indicate to the property administrator 104 that the local network 105 has regained network connectivity. Alternatively, if the monitor control unit 110 determines that the interruption to the network connectivity persists, then a corresponding alert notification may be transmitted to the application server 130, and then to the user device 150.

FIG. 4 illustrates an example of a process 400 for providing internet access through a monitoring system of a rental property. Briefly, the process 400 may include obtaining data indicating that internet access through a network access point within a property is not available (410), automatically establishing an alternate connection to the internet (420), providing internet access to devices in the property through the alternate connection (430), determining that the internet access through the network access point within the property is available (440), and terminating the alternate connection in response to determining that the internet access through the network access point within the property is available (450).

In more detail, the process 400 may include obtaining data indicating that internet access through a network access point within a property is not available (410). For instance, as described previously with respect to FIG. 3, the user device 150 associated with the property administrator 104 may obtain data from the application server 130 indicating that internet access through the network access point 128 is presently not available.

The process 400 may include automatically establishing an alternate connection to the internet (420). For instance, the user device 150 may transmit an instruction to configure the monitor control unit 110 to establish an alternate connection to the internet 107. As described previously with respect to FIG. 2B, the property administrator 104 may use the interface element 220c to transmit a remote instruction to configure the monitor control unit 110. The monitor control unit 110 may then provide temporary access to the internet 107 for devices within the rental property 101. In some instances, the temporary internet access is provided by using the monitor control unit 110 as a wireless hotspot to share network connectivity through a cellular network that is connected to the monitor control unit 110. In other instances, the monitor control unit 110 may be connected to multiple networks including the local network 105. In such instances, when there is an interruption to the connectivity of the local network 105, then the monitor control unit 110 can be configured to provide internet access to devices within the rental property 101 through one or more of its secondary wireless networks.

The process 400 may include providing internet access to devices in the property through the connection (430). For instance, once configured as a personal hotspot or as a secondary network access point, the monitor control unit 110 may be used to provide the devices within the rental property 101 with access to the internet 107 through the alternate connection described above in step 420. In some instances, the internet access may be provided with several network restrictions such as data usage restrictions, connection speed restrictions in order to minimize internet activity over the alternate connection to basic necessities. For example, activity over the alternate connection may be limited to certain webpages and/or applications that the tenant 102 would need to perform basic operations (e.g., check text messages, e-mail, find directions on a map), but not high-data usage operations that may use excessive data usage over the alternate connection. In another example, internet access may be limited based on the security footage collected by a security camera of the property 101 (e.g., only providing internet access when a user is detected within security footage).

The process 400 may include determining that the internet access through the network access point within the property is available (440). For instance, while the monitor control unit 110 provides temporary internet access to devices within the rental property 101, the internet sensor 122 and/or the monitor control unit 110 may periodically monitor the status of the local network 105 to determine if the network access point 128 has regained functionality. In response to determining that the network access point 128 is capable of establishing a connection to the internet 107, the internet sensor 122 and/or the monitor control 110 may determine that the internet access through the network access point 128 has become available.

The process 400 may include terminating the alternate connection in response to determining that the internet access through the network access point within the property is available (450). For instance, the monitor control unit 110 and/or the application server 130 may terminate the alternate connection through the monitor control unit 110 in response to determining that the network access point 128 has regained connectivity to the internet 107. The monitor control unit 110 can then be reconfigured to resume normal operations and allow for the devices within the rental property 101 to utilize the local network 105 to gain access to the internet 107 through the network access point 128. In this regard, internet activity over the alternate connection can be minimized in order to reduce potential added costs for the property administrator 104 when the alternate connection is configured as a high-cost usage network that is used only for emergency situations.

Figure 5:
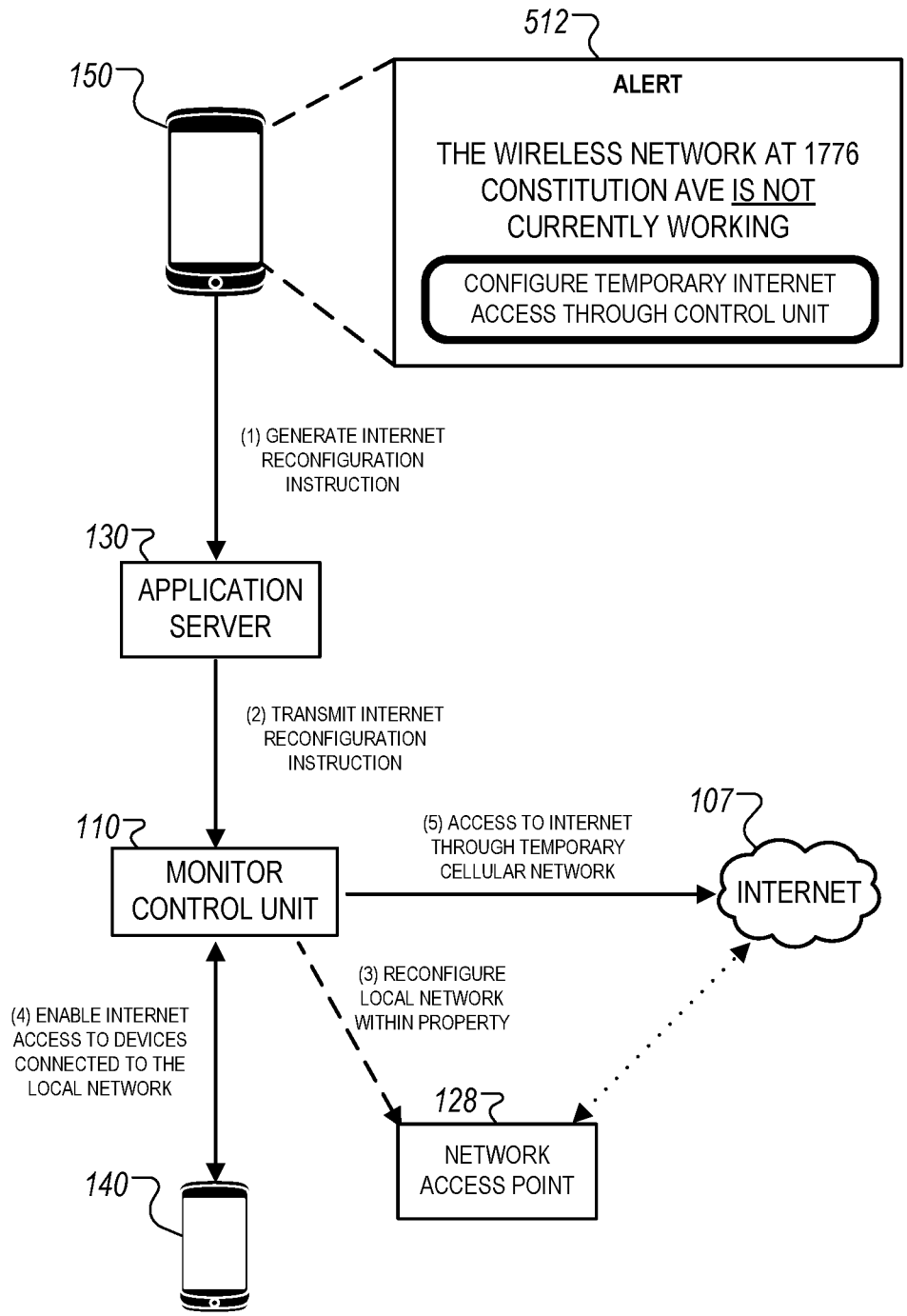
FIG. 5 illustrates an example of a system that is capable of providing internet access through a monitoring system of a rental property.

FIG. 5 illustrates an example of a technique for providing internet access through a monitoring system of a rental property. The illustrated technique may be carried out by the system 100 described previously with respect to FIG. 1. For instance, the user device 150 may receive an input from a property administrator 104 to reconfigure the monitor control unit 110 to provide access to the internet 107 when the network access point 128 is temporarily unavailable and/or malfunctioning. The reconfiguration instruction is then transmitted to the application server 130, which then relays the instruction to the monitor control unit 110. The monitor control unit 110 then reconfigures the local network 105 such that all incoming and outgoing network packets between devices within the rental property 101 and the internet 107 are transmitted through an alternate connection through the monitor control unit 110 instead of the network access point 128.

The user device 150 initially receives an alert notification 512 indicating that devices within the rental property 101 lack access to the internet 107. In this example, the lack of connectivity can be attributed either the devices being unable to establish a connection to the local network 105 (e.g., due to authentication issues), or due to unavailability or malfunctioning of the network access point 128. In another example, the devices within the rental property 101 may be able to access the local network 105, but unable to access the internet 107. In this example, the network access point 128 may be functioning properly, but internet access may be restricted by an Internet Service Provider (ISP) associated with the property 101. The user device 150 may then receive an input from the property administrator 104 within an instruction to reconfigure the local network 105. The instruction is transmitted from the user device 150 to the monitor control unit 110 through the application server 130.

The monitor control unit 110 may then reconfigure internet access of devices within the rental property 101. For example, the monitor control unit 110 may be used with a carrier that enables the monitor control unit 110 to keep a first socket open for a connection over a VPN to the application server 130 and simultaneously open a second socket for connections to servers connected to the internet 107. In this example, the monitor control unit 110 may include Wi-Fi access hardware such as Wi-Fi access point chips. Alternatively, the monitor control unit 110 may be in data communication, e.g., through Ethernet, with Wi-Fi hardware of device that is included in a physically separate device within the system 100.

In some implementations, the monitor control unit 110 may be a client of a known source of internet within the rental property 101. In another example, the monitor control unit 110 may be used with a carrier that only enables the monitor control unit 110 open a single socket. In this example, the monitor control unit 110 may indicate in a header of communications over the single socket whether a communication is intended for a private connection or a public connection. The carrier may then route communications indicated by a header as being for a private connection through a private connection and communications indicated by a header as being for a public connection through a public connection.

Once the local network 105 has been reconfigured according the instructions transmitted by the user device 150, the monitor control unit 110 then provides devices within the rental property 101 with access to the internet 107 without having to use the network access point 128. In this regard, if the local network 105 loses connectivity for a temporary time frame, the property administrator 104 may utilize the technique illustrated in FIG. 5 to provide tenants with a temporary mechanism of accessing the internet 107 through an alternate connection through the monitor control unit 110. In other implementations, the local network 105 can be reconfigured automatically based on monitoring operations performed by the application server 130 (e.g., as illustrated below in FIG. 7). In such implementations, the local network 105 can be reconfigured without any manual input through the user device 150.

FIG. 6 illustrates an example of a process 600 for dynamically configuring a local network within a rental property. Briefly, the process 600 may include obtaining sensor data, internet activity data, and tenant data associated with a rental property (610), determining one or more current network usage parameters for a local network within the rental property (620), generating a dynamic configuration for the local network within the rental property (630), and reconfiguring the local network based on the dynamic configuration (640).

In more detail, the process 600 may include obtaining sensor data, internet activity data, and tenant data associated with a rental property (610). For instance, the application server 160 may obtain sensor data collected by the sensors 126, internet activity reports collected by the internet sensor 122, and tenant data and/or rental data associated with the rental property 101 from the user device 140. The collected sensor data can include, for example, occupancy information based on detected motion within the rental property 101, opening and closing of doors/windows, manual adjustments to thermostat settings, among other types of indicators. The internet activity reports can include internet activity trends such as the peak time periods of internet activity, number of devices connecting to the local network, or the devices that have utilized the greatest amount of network data usage. The tenant data can include information associated with the tenant 102 obtained from a user profile of a rental account, a rental history associated with the tenant 102, or other types of user information provided to the property administrator 104. The rental data can also include a rental period of the rental property 101, subscription and/or service-related information, or other types of information related to the tenant's rental activity.

The process 600 may include determining one or more current network usage parameters for a local network within the rental property (620). For instance, the application server 130 may determine parameters that are descriptive of anticipated network usage of the local network 105 during a particular period of time. Examples of usage parameters can include a number of devices expected to be connected over the local network 105, anticipated overall data usage to be used, particular activities to be performed using the local network 105, or the amount of data to be downloaded over the local network. The application server 130 may compute each network usage parameter using a set of predetermined algorithms that predict network usage based on different types of data collected by the system 100. For example, data indicating high occupancy at specified time periods that are associated with high internet activity can be used to compute a value for a corresponding network usage parameter that indicates a high likelihood of large internet usage. In another example, if a large portion of devices connected over the local network 105 are laptop computing devices (as opposed to mobile devices), then the application server 130 may also compute a similar value for another network usage parameter.

The process 600 may include generating a dynamic configuration for the local network within the rental property (630). For instance, the application server 130 may select a network configuration based on comparing the obtained sensor data, internet activity data, and rental data to rules specify network configurations for different anticipated network usage scenarios. For instance, each rule may map a specific combination of each type of data to a corresponding network configuration the best optimizes network costs for the anticipated network usage. As an example, a particular rule may specify low data usage and low connection speed for the local network 105 if the sensor data indicates low occupancy and the internet activity data indicates low anticipated network usage. In another example, one rule may specify a low internet connection speed for a basic subscription rental, whereas another rule may specify a high internet connection speed for a premium subscription rental.

The process 600 may include reconfiguring the local network based on the dynamic configuration (640). For instance, the application server 130 may reconfigure the local network 105 in accordance with a selected network configuration rule as described above. The application server 130 may transmit a reconfiguration instruction to the monitor control unit 110, which then reconfigures the network access point 128 of the local network 105 with the specified network settings associated with the network configuration.

Figure 7:
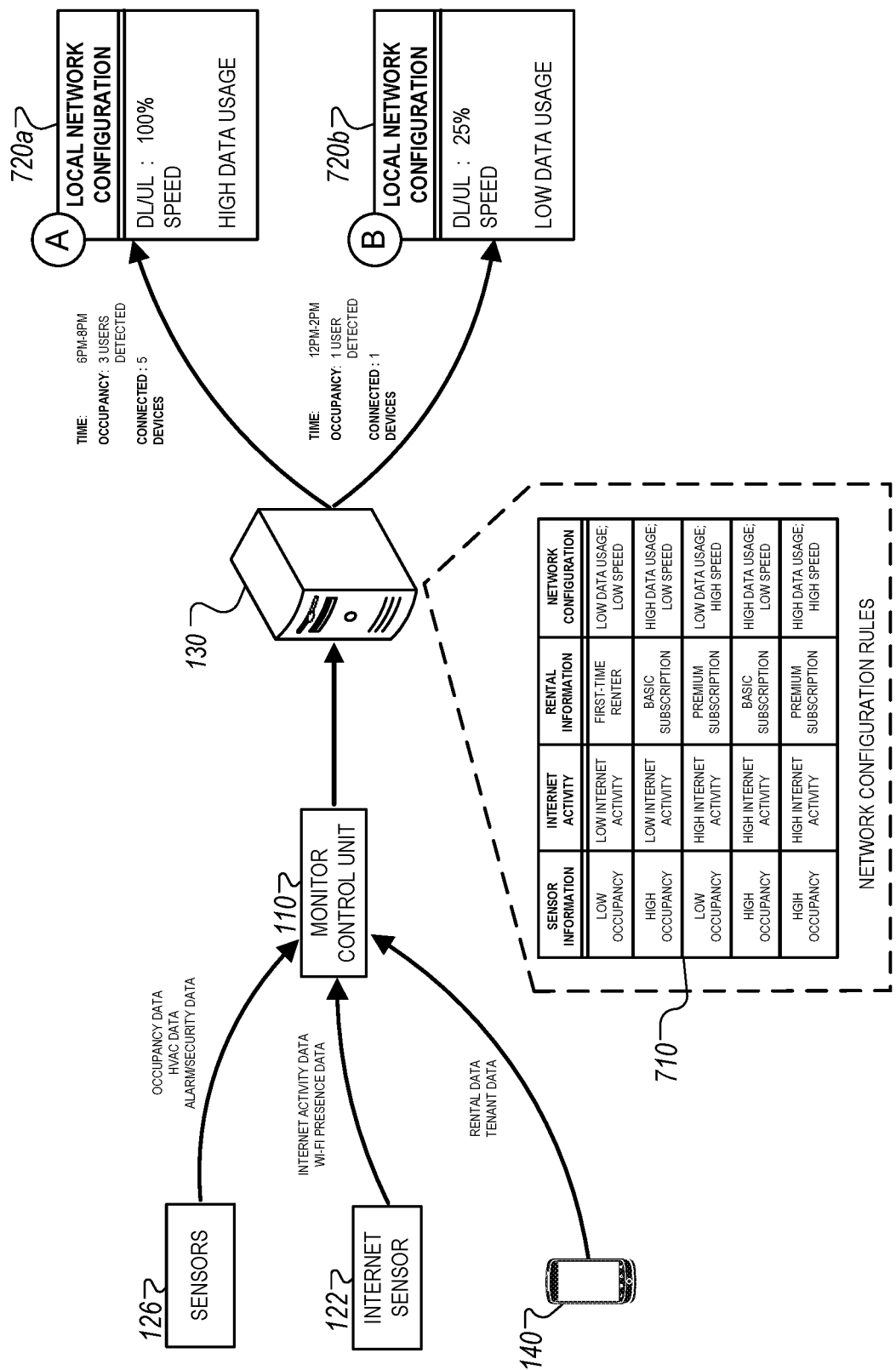
FIG. 7 illustrates an example of a system that is capable of dynamically configuring a local network within a rental property.

FIG. 7 illustrates an example of a technique for dynamically configuring a local network within a rental property. As depicted, the monitor control unit 110 may initially receive sensor data collected by the sensors 126, internet activity data collected by the internet sensor 122, and/or tenant data from the user device 140. The monitor control unit 110 may process each of the different types of data obtained and provide the processed data to the application server 130. The application server 130 then utilizes a set of network configuration rules specified within a rule repository 710 to generate a dynamic network configuration that is based on the different types of data obtained by the monitor control unit 110. In some instances, the technique illustrated may be executed by the system 100 as depicted in FIG. 7.

The dynamic network configuration generated by the application server 130 can be used to account for different types of network usage scenarios that are impacted by, for example, the number of users present within the rental property 101, internet activity patterns at different time periods over the local network 105, among others. In this regard, application of the dynamic network configuration can be used to reduce extraneous network usage that not attributed to tenant usage during time periods of low anticipated network usage in order to reduce costs with network consumptions. Other advantages to the application of the dynamic network configuration are described below.

Initially, the monitor control unit 110 receives various types of data collected by the components of the system 100. For instance, as illustrated and described previously with respect to FIG. 1, the monitor control unit may obtain occupancy data, HVAC data, alarm/security data collected by various sensors 126 located within the rental property 101. In addition, the monitor control unit 110 may obtain activity reports from that internet sensor 122 that specifies internet activity data and/or Wi-Fi presence data over a particular period of time. The monitor control unit 110 may also obtain rental data such as the time period of rental, user data such as a user's rental history and/or rental subscription information from the user device 140 associated with the tenant 102. The obtained data can be processed and/or aggregated and then transmitted to the application server 130 over either the internet 107 or through a private cellular connection as described previously.

The application server 130 then compares the various types of obtained data against a set of network configuration rules specified within the rule repository 710. Each network configuration rule may specify a particular network configuration based on set of present circumstances indicated by the sensor information, internet activity, and/or rental information. For instance, each rule can be descriptive of a particular network usage scenario using a set indicators associated with the data obtained by the monitor control unit 110. As an example, low occupancy (e.g., indicated by low detection motion activity, lack of doors/windows closing) can be used to indicate that tenants may not be currently present within the rental property 101. In another example, limited internet activity over the local network 105 can indicate that tenants are performing other actions that are not dependent on internet access (e.g., watching television, cooking, sleeping, etc.). In addition, rental information can be used to indicate a rental history of the user or the type of rental agreement associated with the user device 140.

The application server 130 then selects an applicable configuration rule from among the rule repository 710 to dynamically configure the local network 105. In the figure, two examples of internet configurations that can be applied by the application server 130 are illustrated. The different configurations are selected based on a combination of factors indicated by the various types of data obtained by the monitor control unit 110. For example, the application server 130 selects a configuration 720a in the first instance because the obtained data indicates that the time is between 6 PM and 8 PM, that the rental property 101 is presently occupied by three users, and that five devices are connected over the local network 105. In this example, the sensor information indicates high occupancy and internet activity data indicates high potential usage. Thus, in response, the application server 130 selects a configuration that maintains the maximum internet connection speed and network data usage of the local network 105.

In contrast, in the second instance, the application server 130 selects a configuration 720b because the obtained data indicates that the time is between 12 PM and 2 PM, that the rental property 101 is presently occupied by one user, and that one device is connected over the local network 105. In this example, the sensor information indicates low occupancy and the internet activity data indicates low potential usage. Thus, in response, the application server 130 selects configuration that reduces the connection speed down to 25% and network bandwidth to 50% of the maximum data usage of the local network 105.

In the examples described above, network configuration rules consider a combination of information obtained from collected sensor data, internet activity data, and rental data in order to intelligently determine time periods during which network usage may be prioritized. In other examples, network configuration rules can be based entirely on each type of data. For instance, particular rules that are only associated with collected sensor data can be used to distinguish between different types of occupancy within the rental property 101. As an example, if occupancy within the rental property 101 is by children (or other types of users that are unlikely to use the internet), then a configuration can be selected to reduce potential internet usage.

In other examples, rules that are only associated with internet activity data can be used to distinguish between different types of internet usage scenarios. For example, the application server 130 may determine the number of devices connected over the local network 105, and the types of devices connected over the local network 105 in selecting a suitable network configuration.

In some implementations, rules can be used to provide varying levels of network services within a rental property 101 based on a type of rental that is provided. For example, different network configuration rules can be applied for short-term rental periods (e.g., two to three days) versus long-term rental periods (e.g., one-year lease). In another example, different network configurations can be applied for different types of users that agree to rent the rental property 101. For instance, repeat users may be offered certain advantages for their ongoing loyalty relative to first-time users. In another instance, users that have subscribed a premium rental subscription can be offered faster network connectivity relative to users that have a basic subscription.

FIG. 8 illustrates an example of a process 800 for dynamically configuring a network access point of a property during a specified rental period. Briefly, the process 800 can include the operations of receiving rental data that indicates a property that has been rented for a specified rental period (810), obtaining sensor data collected by one or more sensors of the property during the specified rental period (820), determining a current occupancy of the property during the specified rental period (830), obtaining network data indicating network activity on a network access point during the specified rental period (840), and configuring the network access point during the specified rental period (850).

The process 800 is generally discussed in reference to system 100, although any system can be used to perform the operations of the process 800. The descriptions below reference the application server 130 performing the operations of the process 800. However, in some implementations, one or more of the operations can be performed by the monitor control unit 110, the internet sensor 112, and/or a combination thereof. For example, the monitor control unit 110 may configure the network access point 128 based on an instruction received from the application server 130. In another example, the internet sensor 122 can directly configure the network access point 128 based on monitoring network activity over the network access point 128.

In more detail, the process 800 can include the operation of receiving rental data that indicates a property that has been rented for a specified rental period (810). For example, the application server 130 and/or the monitor control unit 110 can receive rental data that indicates that the property 101 has been rented for a temporary period, e.g., one week, by the tenant 102. As discussed above with respect to FIGS. 6 and 7, the received rental data can include tenant information, such as user information from a rental account, rental history of the tenant 102, or other types of useful information. The rental data can also include subscription and/or service-related information associated with the property 101, such as a total network data usage allowance for the network access point 128 during the specified rental period, different types of rental subscriptions that are offered by the property administrator 104 for renting the property. In the example depicted in FIG. 7, the rental data specifies a "BASIC SUBSCRIPTION," which provides a lower connectivity speed over the network access point 128, and a "PREMIUM SUBSCRIPTION," which provides higher connectivity speed over the network access point 128.

The process 800 can include the operation of obtaining sensor data collected by one or more sensors of the property during the specified rental period (820). For example, the application server 130 and/or the monitor control unit 110 can obtain sensor data collected by one or more of the sensors 126 of the property 101 during the specified rental period. As discussed above with respect to FIGS. 6 and 7, the sensor data can include information that indicates occupancy, e.g., indicates detected motion within the rental property 101, opening and closing of doors/windows, manual adjustments to thermostat settings, among other types of sensor data. Additionally, the sensor data can include data that is cumulatively monitored over the specified rental period, e.g., total data usage used during the rental period, and data is periodically monitored to represent a present status for the property 101, e.g., a current occupancy of the property 101. In this regard, the sensor data can be periodically collected at specified intervals, e.g., hourly, daily, etc., or alternatively, in real-time over the entirety of the specified rental period.

The process 800 can include the operation of determining current occupancy of the property during the specified rental period (830). For example, the application server 130 and/or the monitor control unit 110 can determine a current occupancy of the property 101 during the specified rental period based on the obtained sensor data. As discussed above in the example depicted in FIG. 7, the current occupancy can represent the number of individuals that are presently determined and/or predicted to be inside the property 101. For instance, "LOW OCCUPANCY" can represent that the property 101 is presently vacant because the tenant 102 and any other individual associated with the property rental are not presently inside the property. In other instances, "HIGH OCCUPANCY" can represent that the property 101 is presently being occupied by the tenant 102 and other associated individuals, including guests that are not associated with the property rental.

The process 800 can include the operation of obtaining network data indicating network activity on a network access point during the specified rental period (840). For example, the application server 130 and/or the monitor control unit 110 can obtain network data indicating network activity on the network access point 128 of the property 101 during the specified rental period. As discussed above in FIGS. 6 and 7, the network data can include network activity reports that include internet activity trends such as the peak time periods of network activity, number of devices connecting to the network access point 128, or the devices that have utilized the greatest amount of network data usage. In this regard, the network data can include historical data, e.g., total data usage utilized over the rental period, as well as current data that changes over time, e.g., number of devices presently accessing the network access point 128. In some instances, the network data can be collected by a dedicated device, such as the Internet sensor 122. In such instances, the network data can include network activity detected by the Internet sensor 122 over the network access point 128, Wi-Fi presence data within the property 101, detected attempts to access restricted webpages, and/or detections of possible network security breaches.

The process 800 can include the operation of configuring the network access point during the specified rental period (850). For example, the application server 130 and/or the monitor control unit 110 can configure the network access point 128 based at least on the network activity data and the present occupancy of the property 101. As discussed above in reference to FIGS. 6 and 7, the network access point 128 can be dynamically configured to allow for different configurations based on the circumstances of the property 101 during the specified rental period. In the example depicted in FIG. 7, the application server 130 and/or the monitor control unit 110 configures the network access point 128 using either the configuration 720*a* or the configuration 720*b* based on the present circumstances of the property 101. For example, the network access point 128 can be configured using the configuration 720*a* when the property 101 presently has high occupancy, or alternatively, configured using the configuration 720*b* when the property 101 presently has low occupancy.

In some implementations, the rental data identifies a type of rental associated with the specified rental period. For example, as depicted in FIG. 7, the rental data can specify different types of rental subscriptions associated with a rental account of the tenant 102, such as "FIRST-TIME RENTER," "BASIC SUBSCRIPTION," and "PREMIUM SUBSCRIPTION." In one example, the current occupancy of the property 101 indicates that the property is not currently occupied, and configuring the network access point 128 during the specified rental period includes reducing a connection speed of the network access point 128. In this example, the reduction in connection speed reduces the data usage consumption over the network access point 128 during time periods when tenants associated with the rental are not likely to be present within the property.

In some instances, the application server 130 and/or the monitor control unit 110 performs additional configuration operations after reducing the connection speed of the network access point 128. For example, the application server 130 and/or the monitor control unit 110 may obtain additional sensor data collected by the sensors 126 of the property 101 during the specified rental period, and then determine, from the additional sensor data, an updated occupancy of the property during the specified rental period. In this example, the updated occupancy can indicate that the property 101 is currently occupied. In response to the change in the occupancy, the application server 130 and/or the monitor control unit 110 reconfigures the network access point 128 during the specified rental period to increase the connection speed of the network access point 128. In this regard, the network access point 128 can be configured and reconfigured based on the current occupancy of the property 101.

In some implementations, the obtained network data can be used to identify unauthorized network activity over the network access point 128 of the property 101 during the specified rental period. As discussed above, the network data can be collected by the internet sensor 122 that is configured to monitor network activity over the network access point 128. In such implementations, the application server 130 and/or the monitor control unit 110 can dynamically update a network access credential that provides access to the network access point 128 in a manner similar the technique discussed with respect to FIG. 2B. In this regard, once unauthorized network activity is detected over the network access point 128, the network access credential provided to the tenant 102 is revoked so that he/she is unable to further access the network access point 128 until, for example, the property administrator 104 re-grants access.

In some implementations, the obtained network data indicates that the network access point 128 is presently unable to provide access to a wide area network. For example, as discussed above in FIG. 3, the application server 130 and/or the monitor control unit 110 may obtain data indicating that the Internet access through the network access point 128 within the property 101 is not available. In such implementations, the application server 130 and/or the monitor control unit 110 can establish an alternative network access point to provide access to the Internet. As discussed above, the alternative network access point can provide access to a wide area network through a cellular network of the monitor control unit 110.

In some implementations, configuring the network access point during the specified rental period as discussed above may include further operations. For example, the application server 130 and/or the monitor control unit 110 can provide a communication indicating the obtained network data or the sensor data to the user device 150 of the property administrator 104, as depicted in FIGS. 2A and 2B. In such implementations, the application server 130 and/or the monitor control unit 110 can receive data indicating a selection of a particular network configuration by the property administrator 104. For example, as depicted in FIG. 2B, the data can indicate a selection of one of the user interface elements 220a-d corresponding to different configurations for the network access point 128. In response to receiving the data indicating the selection, the application server 130 and/or the monitor control unit 110 can configure the network access point 128 according to the particular network configuration selected by the property administrator 104. In this regard, the network access point 128 can be configured automatically (e.g., without user input), or manually based on selection by the property administrator 104 in response to collected data.

In some implementations, the received rental data indicates a total data usage allocation for the network access point 128 during the specified rental period. For example, the total data usage allocation can refer to the total amount of data over the network access point 128 that the tenant 102 can use during the specified rental period of the property 101, e.g., 1 Gigabyte of network data. In some instances, the obtained network data can indicate that data usage associated with network activity over the network access point 128 of the property 101 during the specified rental period exceeds the total data usage allocation for the network access point. In such instances, the application server 130 and/or the monitor control unit 110 can configure the network access point 128 during the specified rental period to reduce the network speed of the network access point 128. Alternatively, the application server 130 and/or the monitor control unit 110 can terminate access to the network access point 128 by the tenant 102.

In some implementations, the configuration of the network access point 128 during the specified rental period, as discussed above, is performed by accessing a repository that includes multiple configuration rules. For example, as shown in FIG. 7, the application server 130 can access the rule repository 710 that includes different configuration rules for the network access point 128. As discussed above, each configuration rule in the repository 710 specifies a respective condition for the rental data, the sensor data, and the network data, and a different configuration for the network access point 128. In the example, the application server 130 determines that the rental data, the sensor data, or the network data satisfies one or more conditions specified by a particular configuration rule from among the multiple configurations, and then selects a rule to configure the network access point 128. The application server 130 and/or the monitor control unit 110 then configures the network access point 128 using a network configuration specified by the selected rule. As shown in FIG. 7, the application server 130 selects a first rule in the repository 710 that specifies the configuration 720a if the obtained data indicates that the property 101 is presently occupied by three users and five devices are connected over the network access point 128. Alternatively, the application server 130 selects a second rule in the repository 710 that specifies the configuration 720b if the obtained data indicates that the property is presently occupied by one user and only one device is connected over the network access point 128.

Although the operations of the process 800 are discussed above in reference to a specified rental period, in some implementations, the operations can also be performed during time periods when the property 101 has not been rented to a tenant (i.e., during a time period between specified rental periods). For example, the application server 130 and/or the monitor control unit 110 can obtain sensor data collected by the sensors 126 and network data collected by the internet sensor 122 before a rental period is scheduled to be started and/or after a rental period is scheduled to be ended. The application server 130 and/or the monitor control unit 110 can also determine a current occupancy during these time periods. In such implementations, the obtained sensor data, network data, and the current occupancy can be used to identify unauthorized access or activity within the property 101 during time periods when the property 101 is not being actively rented by a tenant. For example, the application server 130 and/or the monitor control unit 110 can identify unauthorized network activity over the network access point 128 if the network data indicates detected network activity during a time period when the property 101 is expected to be vacant. As another example, the application server 130 and/or the monitor control unit 110 can determine an unauthorized intrusion within the property 110 if the obtained sensor data indicates that the property 101 is presently occupied by one or more individuals during a time period when the property 101 is expected to be vacant.

In some instances, the operations discussed above are performed prior to the start of a rental period to verify, for example, that the network access point 128 is ready to be accessed by the tenant 102. For example, the application server 130 and/or the monitor control unit 110 may evaluate network performance over the network access point 128 to ensure that the network access point 128 is properly configured prior to the start of a rental period, e.g., ensuring that a network access credential distributed to the user device 150 is capable of providing access to the network access point 128. In other instances, the operations discussed above are performed to ensure that a monitoring system of the property 101 are properly functioning prior to the start of a rental period. For example, the application server 130 and/or the monitor control unit 110 can perform device diagnostics on the sensors 126 to ensure that they are capable of collecting sensor data during the rental period. Additionally, or alternatively, the operations discussed above can be performed after the termination of a rental period to ensure that the tenant 102 has performed any unauthorized actions during the rental period, e.g., manipulated one or more of the sensors 126, or manually adjusting a network configuration of the network access point 128 without permission from the property administrator 104.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
   receiving rental data that indicates a property that has been rented for a rental period;
   obtaining sensor data collected by one or more sensors of the property;
   determining that a current time is during the rental period;
   determining, based on the sensor data, a current occupancy of the property during the rental period;
   obtaining network data indicating network activity over a network access point of the property during the rental period; and
   configuring at least a connection speed of the network access point based at least on the network activity indicated by the network data, the current occupancy, and the current time that is determined to be during the rental period.

2. The method of claim 1, wherein:
   determining the current occupancy of the property during the rental period comprises determining that the property is not occupied at the current time; and
   configuring at least the connection speed of the network access point during the rental period comprises reducing the connection speed of the network access point at the current time.

3. The method of claim 2, further comprising, after reducing the connection speed of the network access point at the current time:
   obtaining additional sensor data collected by the one or more sensors of the property during the rental period;
   determining, from the additional sensor data, an updated occupancy of the property at a second time during the rental period, the updated occupancy indicating that the property is currently occupied at the second time; and
   increasing the connection speed of the network access point at the second time based on the updated occupancy indicating that the property is currently occupied at the second time.

4. The method of claim 1, wherein:
   the network data indicates unauthorized network activity over the network access point of the property during the rental period; and
   configuring at least the connection speed of the network access point comprises updating a network access credential that provides access to the network access point.

5. The method of claim 1, wherein:
   the network data indicates that the network access point is presently unable to provide access to a wide area network; and
   configuring at least the connection speed of the network access point during the rental period comprises establishing an alternative network access point through a control unit of a monitoring system of the property, the alternative network access point providing access to the wide area network through a cellular network of the control unit.

6. The method of claim 1, wherein configuring at least the connection speed of the network access point during the rental period comprises:
   providing, to a computing device of a property administrator, a communication indicating the network data or the sensor data;
   receiving, from the computing device, data indicating a particular network configuration selected by the property administrator for the network access point; and
   in response to receiving the data indicating the particular network configuration, configuring the network access point according to the particular network configuration.

7. The method of claim 1, wherein:
   the rental data indicates a total data usage allocation for the network access point during the rental period;
   the network data indicates that data usage associated with network activity over the network access point of the property during the rental period exceeds the total data usage allocation for the network access point; and
   configuring at least the connection speed of the network access point during the rental period comprises reducing a network speed of the network access point during the rental period.

8. The method of claim 1, wherein configuring at least the connection speed of the network access point during the rental period comprises:
   accessing a repository including multiple configuration rules, each configuration rule specifying (i) a respective condition for the rental data, the sensor data, and the network data, and (ii) a different configuration for the network access point;
   determining that the rental data, the sensor data, or the network data satisfies one or more conditions specified by a particular configuration rule from among the multiple configurations; and
   configuring at least the connection speed of the network access point using a configuration for the network access point specified by the particular configuration rule based on determining that the rental data, the sensor data, or the network data satisfies the one or more conditions specified by the particular configuration rule.

9. The method of claim 1, wherein:
   determining the current occupancy of the property during the rental period comprises determining that the property is occupied at the current time; and configuring at least the connection speed of the network access point during the rental period comprises increasing the connection speed of the network access point at the current time.

10. A system comprising:
one or more computers; and
one or more storage devices storing instructions that are operable, when executed by one or more computers, to cause the one or more computers to perform operations comprising:
  receiving rental data that indicates a property that has been rented for a rental period;
  obtaining sensor data collected by one or more sensors of the property;
  determining that a current time is during the rental period;
  determining, based on the sensor data, a current occupancy of the property during the rental period;
  obtaining network data indicating network activity over a network access point of the property during the rental period; and
  configuring at least a connection speed of the network access point based at least on the network activity indicated by the network data, the current occupancy, and the current time that is determined to be during the rental period.

11. The system of claim 10, wherein:
determining the current occupancy of the property during the rental period comprises determining that the property is not occupied at the current time; and
configuring at least the connection speed of the network access point during the rental period comprises reducing the connection speed of the network access point at the current time.

12. The system of claim 11, wherein, after reducing the connection speed of the network access point at the current time, the operations further comprise:
  obtaining additional sensor data collected by the one or more sensors of the property during the rental period;
  determining, from the additional sensor data, an updated occupancy of the property at a second time during the rental period, the updated occupancy indicating that the property is currently occupied at the second time; and
  increasing the connection speed of the network access point at the second time based on the updated occupancy indicating that the property is currently occupied at the second time.

13. The system of claim 10, wherein:
the network data indicates unauthorized network activity over the network access point of the property during the rental period; and
configuring at least the connection speed of the network access point comprises updating a network access credential that provides access to the network access point.

14. The system of claim 10, wherein:
the network data indicates that the network access point is presently unable to provide access to a wide area network; and
configuring at least the connection speed of the network access point during the rental period comprises establishing an alternative network access point through a control unit of a monitoring system of the property, the alternative network access point providing access to the wide area network through a cellular network of the control unit.

15. A non-transitory computer-readable medium storing software comprising instructions executable by one or more which, upon such execution, cause the one or more computers to perform operations comprising:
  receiving rental data that indicates a property that has been rented for a rental period;
  obtaining sensor data collected by one or more sensors of the property;
  determining that a current time is during the rental period;
  determining, based on the sensor data, a current occupancy of the property during the rental period;
  obtaining network data indicating network activity over a network access point of the property during the rental period; and
  configuring at least a connection speed of the network access point based at least on the network activity indicated by the network data, the current occupancy, and the current time that is determined to be during the rental period.

16. The non-transitory computer-readable medium of claim 15, wherein:
determining the current occupancy of the property during the rental period comprises determining that the property is not occupied at the current time; and
configuring at least the connection speed of the network access point during the rental period comprises reducing the connection speed of the network access point at the current time.

17. The non-transitory computer-readable medium of claim 16, wherein, after reducing the connection speed of the network access point at the current time, the operations further comprise:
  obtaining additional sensor data collected by the one or more sensors of the property during the rental period;
  determining, from the additional sensor data, an updated occupancy of the property at a second time during the rental period, the updated occupancy indicating that the property is currently occupied at the second time; and
  increasing the connection speed of the network access point at the second time based on the updated occupancy indicating that the property is currently occupied at the second time.

18. The non-transitory computer-readable medium of claim 15, wherein:
the network data indicates unauthorized network activity over the network access point of the property during the rental period; and
configuring at least the connection speed of the network access point comprises updating a network access credential that provides access to the network access point.

19. The non-transitory computer-readable medium of claim 15, wherein:
the network data indicates that the network access point is presently unable to provide access to a wide area network; and
configuring at least the connection speed of the network access point during the rental period comprises establishing an alternative network access point through a control unit of a monitoring system of the property, the alternative network access point providing access to the wide area network through a cellular network of the control unit.

20. The non-transitory computer-readable medium of claim 15, wherein configuring at least the connection speed of the network access point during the rental period comprises:
- providing, to a computing device of a property administrator, a communication indicating the network data or the sensor data;
- receiving, from the computing device, data indicating a particular network configuration selected by the property administrator for the network access point; and
- in response to receiving the data indicating the particular network configuration, configuring the network access point according to the particular network configuration.

21. The non-transitory computer-readable medium of claim 15, wherein:
- the rental data indicates a total data usage allocation for the network access point during the rental period;
- the network data indicates that data usage associated with network activity over the network access point of the property during the rental period exceeds the total data usage allocation for the network access point; and
- configuring at least the connection speed of the network access point during the rental period comprises reducing a network speed of the network access point during the rental period.

* * * * *

UNITED STATES PATENT AND TRADEMARK OFFICE
CERTIFICATE OF CORRECTION

PATENT NO. : 10,541,865 B1
APPLICATION NO. : 15/810549
DATED : January 21, 2020
INVENTOR(S) : Michael Montgomery Brophy, Charles Richard Alpert and Roy Franklin Perry Page 1 of 1

It is certified that error appears in the above-identified patent and that said Letters Patent is hereby corrected as shown below:

In the Claims

In Column 30, Claim 15, Line 3, after "cause" delete "the".

Signed and Sealed this
Sixteenth Day of June, 2020

Andrei Iancu
*Director of the United States Patent and Trademark Office*